J. F. STILL.
Coffee Pot.
No. 109,152.  Patented Nov 8, 1870.
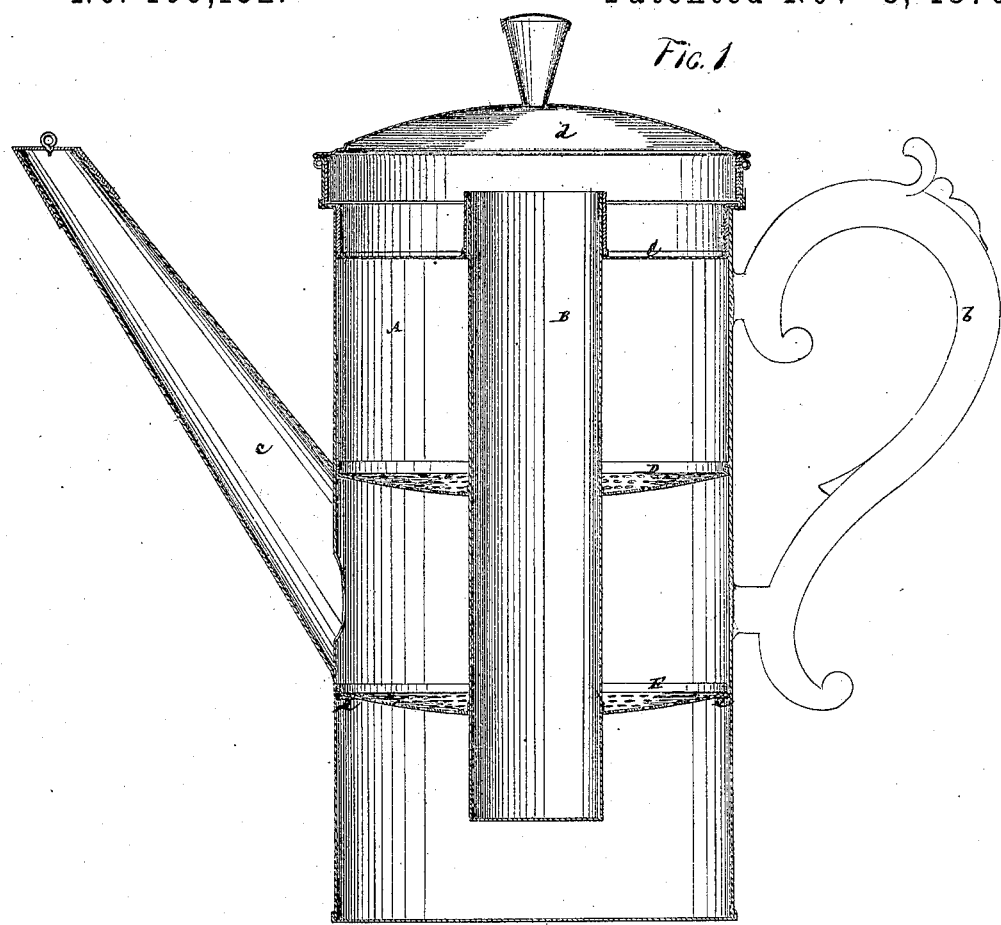
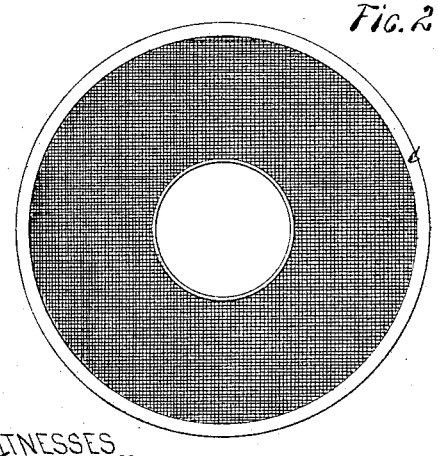
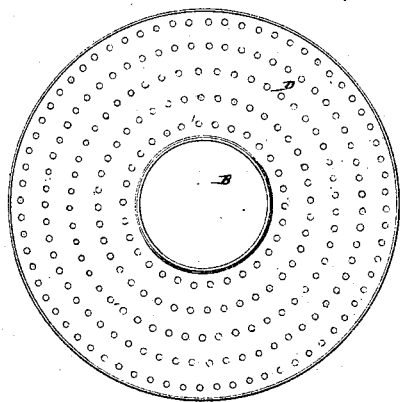

United States Patent Office.

JOHN F. STILL, OF WEST FARMS, NEW YORK.

Letters Patent No. 109,152, dated November 8, 1870.

IMPROVEMENT IN COFFEE-POTS.

The Schedule referred to in these Letters Patent and making part of the same.

*To all whom it may concern:*

Be it known that I, JOHN F. STILL, of West Farms, in the county of Westchester and State of New York, have invented a new and useful Improvement in Coffee-Pots, of which the following is a full, clear, and exact description, reference being had to the accompanying drawing forming part of this specification, and in which—

Figure 1 represents a sectional elevation of a coffee-pot constructed in accordance with my improvement;

Figure 2, a top view of an upper screen used therein; and

Figure 3 a like view of a lower screen, and overflow attachment or fitting.

Similar letters of reference indicate corresponding parts.

My invention consists in a novel combination and arrangement of screens within the pot; also, in an overflow-chamber arranged therein, whereby coffee of a superior and clearer quality may be made in a more economical manner, or from a small amount of the ground berry, and any overflow in boiling is caught by a chamber within the pot for the purpose, thereby doing away with its escape on the outside of the latter.

Referring to the accompanying drawing—

A represents the body of the pot, of which b is the handle;

c, the spout; and d, the lid.

Fitting down within the body, in a removable manner, is a well or chamber, B, extending from near the top of the body to any desired depth therein. This well serves to catch any overflow of the coffee in boiling, and prevent its escape to the outside of the pot.

C is an upper removable screen or sieve fitted to the pot, so that it surrounds the well B at a little distance below its upper edge.

This screen I prefer to fit in a loose manner around the well B, which latter has further arranged around it, and preferably secured to it additional lower screens, D E, of which there may be any desired number.

The bottom one, E, of these additional screens may be made to rest upon a ledge, e, arranged around the interior of the body A at a suitable distance from its bottom, whereby said screen, together with the screen D and the well B, are supported in their places, with provision for their removal from the pot when required.

In making coffee it is preferred to put a certain amount of the ground berry in the bottom of the body of the pot, and, after insertion of the well B with its screens D and E, and the screen C, to place the balance of the ground coffee used in a single making upon the top of the upper screen C, and then to pour the desired quantity of boiling water over the coffee on the latter screen into the pot.

The top screen being covered with coffee-grounds, the aroma is retained from the coffee below within the pot, and the several screens operate to check objectionable ebullition; also to prevent grounds or sediment from mixing with the clear liquid in its passage to the spout that opens into the body above the lower screen E.

What is here claimed, and desired to be secured by Letters Patent, is—

1. The overflow-chamber or well B, within the body of the pot, substantially as specified.

2. The combination of the overflow-well B and screen D or D and E, with the upper sieve or screen C, substantially as specified.

JOHN F. STILL.

Witnesses:
 FRED. HAYNES,
 R. E. RABEAU.